United States Patent [19]

Ballard

[11] Patent Number: 5,074,618
[45] Date of Patent: Dec. 24, 1991

[54] BICYCLE SEAT

[76] Inventor: Thomas B. Ballard, 25550 Mulberry Dr., Southfield, Mich. 48034

[21] Appl. No.: 472,695

[22] Filed: Jan. 31, 1990

[51] Int. Cl.[5] ................................................ B62J 1/26
[52] U.S. Cl. .................................. 297/199; 297/204; 297/214; 297/215
[58] Field of Search ............... 297/195, 198, 199, 200, 297/204, 205, 206, 214, 215, 298, 302; 248/626, 622

[56] References Cited

U.S. PATENT DOCUMENTS

| | | | |
|---|---|---|---|
| 2,241,250 | 5/1941 | Faulhaber | 297/214 |
| 2,454,538 | 11/1948 | Bazley et al. | 248/626 X |
| 2,938,700 | 5/1960 | Castle | 248/626 X |
| 3,844,610 | 10/1974 | Adams | 297/214 X |
| 3,863,982 | 2/1975 | Sandham | 297/302 |
| 4,429,915 | 2/1984 | Flager | 297/214 X |
| 4,572,575 | 2/1986 | Golden et al. | 297/195 |

FOREIGN PATENT DOCUMENTS

| | | | |
|---|---|---|---|
| 3031777 | 3/1982 | Fed. Rep. of Germany | 297/200 |
| 2536034 | 5/1984 | France | 297/199 |
| 263830 | 12/1949 | Switzerland | 297/199 |

Primary Examiner—Peter A. Aschenbrenner
Attorney, Agent, or Firm—Krass & Young

[57] ABSTRACT

The invention relates to a bicycle, or other two-wheel vehicles, seat which utilizes a concave base to distribute the weight, and corresponding pressure, in a comfortable manner. The base, configured as a section of a hollow spheroid, provides for the distribution of pressure and minimizes the central pressure which would be transmitted to the perineal region of the rider. Further, the seat is cushioned by a spring bracket which serves as the site for attachment to the bicycle. The spring bracket includes a plurality of limbs which slideably bear upon and support the bicycle seat.

18 Claims, 2 Drawing Sheets

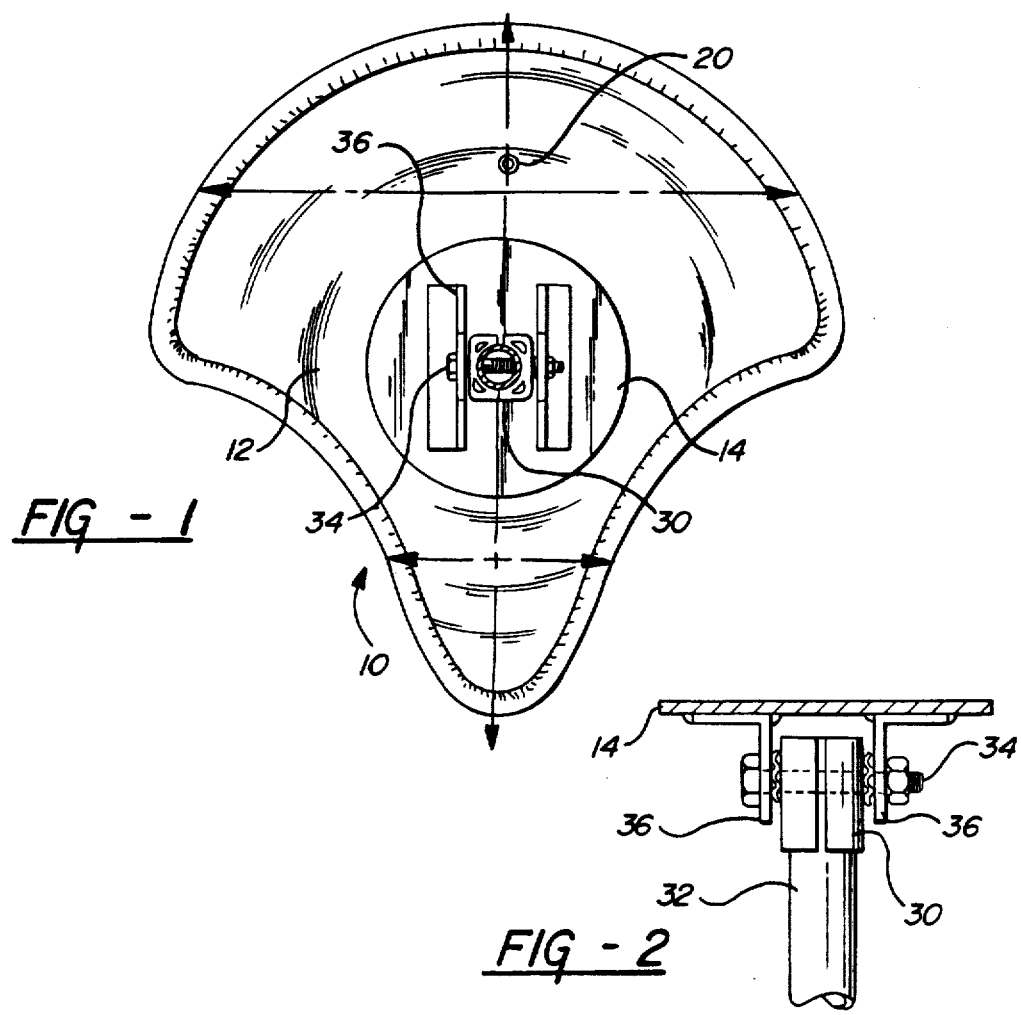
FIG-1
FIG-2
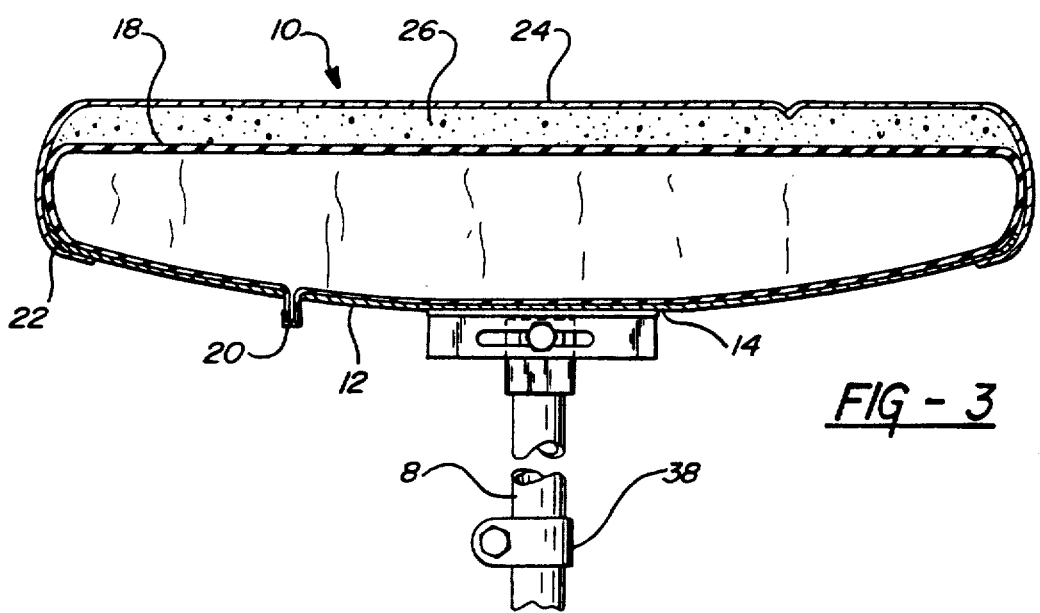
FIG-3

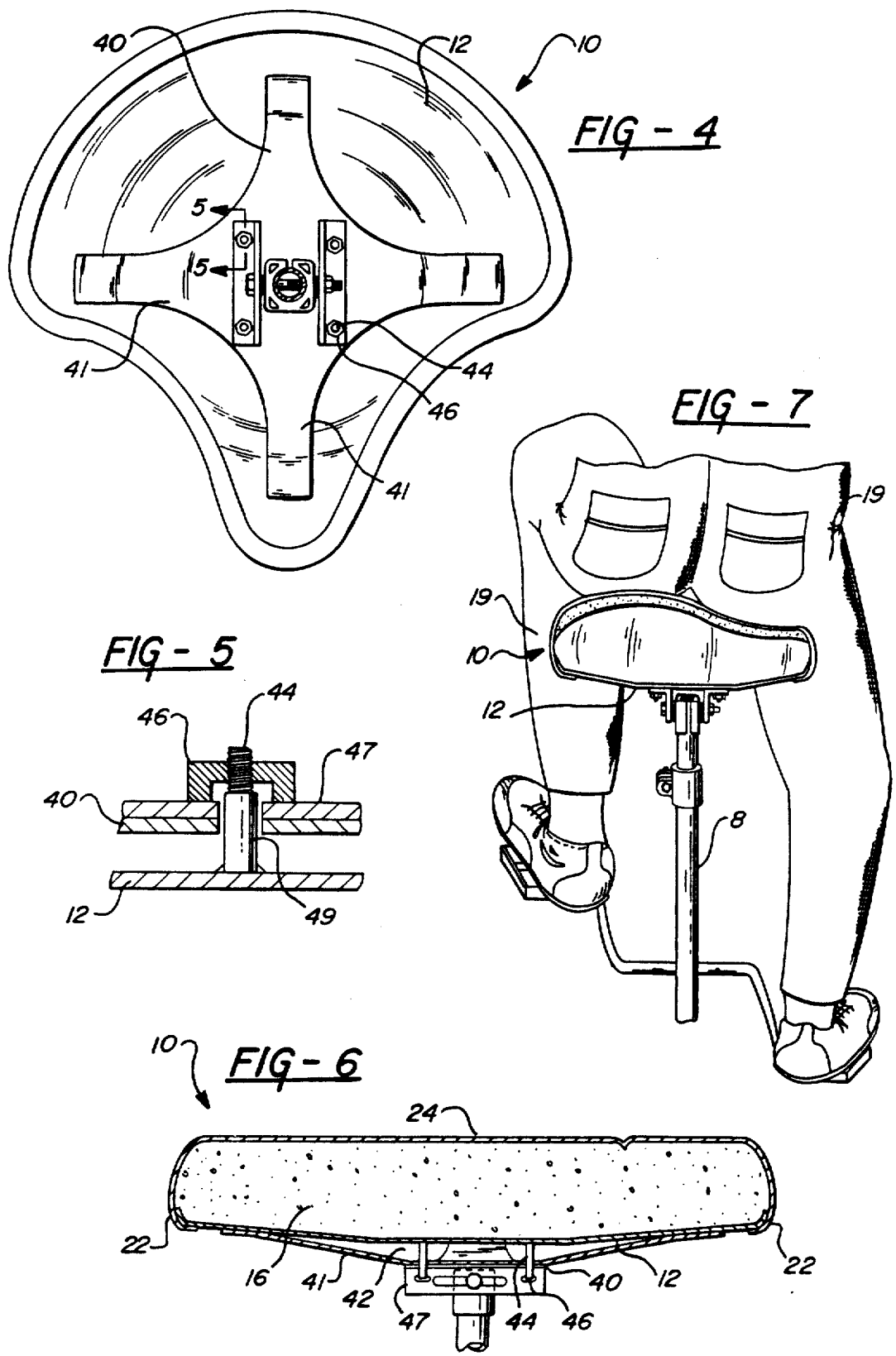

5,074,618

BICYCLE SEAT

FIELD OF THE INVENTION

The present invention relates to seats for two-wheeled vehicles designed for maximum comfort to the user.

BACKGROUND OF THE INVENTION

Bicycles have become quite popular for transportation in recent years. Unfortunately, most conventional bicycle seats, on "10-speed" or racing style bicycles, are uncomfortable to use for extended periods of time. These bicycle seats tend to emulate the narrow and rigid "racing seat" style designed to minimize the friction between the rider's legs and the seat while peddling. This design produces a hard ridge which bears upon the perineal region of the rider while seated, causing discomfort when used over even short distances.

Other bicycles, typically of the non-racing type, utilize wide, soft seats. Wide seats, however, create excessive friction with a rider's legs, when used for extended periods of time. Further, they typically utilize coiled springs (such as U.S. Pat. No. 3,844,610 to Adams) to cushion the impact transmitted to the rider. These springs are easily corroded and are ineffective in providing adequate support for a variety of rider weights.

A variety of bicycle seat configurations are known. Of these, several configurations utilize foam materials for cushioning the seat, such as U.S. Pat. No. 3,558,187 to M. Morse: U.S. Pat. No. 3,758,153 to Bonikowsky: and U.S. Pat. No. 3,712,670 to Svehla et al. The prior art also contains examples of contour conforming a set for a rider, such as U.S. Pat. No. 204,636 to O. Unzicker; U.S. Pat. No. 3,844,611 to Young; U.S. Pat. No. 1,462,976 to F. Mesinger; and U.S. Pat. No. 4,773,705 to Terranova. However, such contour conforming requires precision stamping or moulding to produce the compound curves associated therewith. The prior art also contains examples of seats utilizing an inflatable bladder for cushioning the seat, such as U.S. Pat. No. 4,429,915 to Flager; and U.S. Pat. No. 4,611,851 to Noyes et al.

The present invention is directed at providing a cushioned bicycle seat which neither creates the uncomfortable, narrow ridge of the racing style seat, nor possesses the increased friction of the prior art non-racing style seat.

SUMMARY OF THE INVENTION

The present invention comprises a bicycle seat having a rigid base substantially configured as a section of a hollow sphere, and also shaped to provide a broad rear portion and a narrow front portion. Thus, the base from overhead appears of similar outline to the wide seats of the prior art, but a perspective view of the base reveals the substantially "dished" or upwardly concave nature thereof.

Padding material is inserted into the concavity of the rigid base, which is retained in place by a tailored cover. In this manner, the padding material conforms to the concave side of the base, and as a rider sits down on the seat, the pressure associated with supporting the rider is distributed outwardly, being highest on the outer edges and generally of decreasing magnitude towards the middle.

The padding material can be one of several materials. The first embodiment utilized a uniform layer of urethane foam. The base, being higher around the edges, due to its upwardly concave nature, causes more compression of the foam associated with the edges, and corresponding more pressure is associated with that region. In a second embodiment, an inflatable bladder is disposed inside the concave base. The bladder also conforms to the curvature of the base. As a rider sits down, not having a buttock which conforms to the base, pressure first arises and is maximized at the outer sides. Pressure further decreases progressively toward the middle of the seat.

Means for adjustably attaching the seat to the frame of the bicycle is mounted on the bottom side of the base. A flat portion, centrally located on the base itself or on a bracket attached thereto, provides uniform contact with the top of a tubular frame member and provides a location to mount conventional attachment means. The attachment means is configured to properly support the weight of the rider through a range of fore, aft, and rotational.

The attachment means can further include an adjustable spring suspension mechanism. A bracket of spring steel includes a plurality of curved limbs which are slideably retained against the underside of the base. The limbs flex as they slide along the curvature of the base under the weight of the rider, providing a further cushioning effect The central portion of the bracket includes a flat portion for mounting the attachment means, which is used to be adjustably secured to the down tube of the bicycle as previously described.

BRIEF DESCRIPTION OF THE DRAWINGS

These and other objects and aspects of the invention will become apparent in the detailed description of the invention hereinafter, with respect to the drawings, in which:

FIG. 1 is a plan view of the underside of the base;

FIG. 2 is a view of the standard attachment bracket;

FIG. 3 is a cutaway side view of one embodiment of the invention;

FIG. 4 is a plan view of the underside of the base showing the alternative attachment bracket;

FIG. 5 is a cutaway view of the threaded studs of the alternative attachment bracket along section 5—5 of FIG. 4;

FIG. 6 is a cutaway side view of the invention showing the alternative attachment bracket; and FIG. 7 is a cutaway rear view of the invention in use.

DETAILED DESCRIPTION OF THE PREFERRED EMBODIMENT

The present invention provides a padded bicycle seat 18 which utilizes a contoured base 12 to distribute pressure towards a rider's buttock. Padding material is generally disposed within the base 12 and retained by suitable covering as will be disclosed hereinafter.

With reference to FIGS. 1, 3 and 6, the present invention relates to a bicycle seat 10 built upon a base 12 substantially configured as an upturned section of a hollow sphere. The base 10 is preferably formed of steel or other rigid material to maintain integrity during use. The base 12 may include a flattened mounting region 14 to aid in mounting the seat 10 to a bicycle 8, as will be more fully disclosed hereinafter.

The base 12 is substantially configured as an upturned section of a hollow sphere, and further has a portion thereof removed to provide a pair of leg opening cutouts, giving dimension the seat 10 in a wide, apparently conventional, shape when viewed from directly overhead. The base 12 deviates from, and improves upon, a conventional seat by being substantially configured as an upturned section of a hollow sphere. When viewed in perspective or from the side, it can be seen that the base 12 is concave and generally higher on the edges than in the middle. The base 12 preferably embodies a section of a hollow sphere, but could be made from a hollow ellipse without departing from the invention.

It can be seen from FIGS. 1 and 3, that the base 12 is formed of a plate curved so as to substantially constitute a section of a sphere with a concave upper surface and a convex lower surface. The attachment section 14 is located on the lower surface of the base 12 substantially midway along a longitudinal axis of the base 12. The base 12 forms a rear section symmetrical about the longitudinal axis with its edge substantially constituting a circular arc centered about a point on the attachment section 14 and a contiguous forward section symmetrical about the longitudinal axis. The forward section has widths along lines lateral to the longitudinal axis which are substantially narrower than the widths of the rear section along lateral lines similarly displaced from the attachment section 14.

The base 12 preferably measures 12 to 14 inches in width at its widest point, to provide adequate support to the average adult rider. The base 12 is preferred to have a configuration as a section of a hollow sphere having a diameter in the range of greater or equal to 18 inches and less than or equal to 24 inches. This provides a curvature to the base 12 which substantially effects the progressive pressure distribution. This curvature of the base 12 provides for minimization of pressure in the perineal region of the rider and maximization of pressure to the rider's buttock. The majority of support occurs at the edge of base 12 and progressively decreases in intensity proceeding toward the middle, as will hereinafter be disclosed.

In a first embodiment, with reference specifically to FIG. 6, a uniformly dimensioned layer of urethane foam material 16 is disposed in the concavity created by the curvature of base 12 to cushion seat 10. As a rider sits down, the curvature of the base 12 causes initial and maximum compression of the foam material 16 around the upturned lip 22 of base 12 causing more pressure to be exerted at the edge to support the rider. This curvature minimizes the pressure associated with the middle of the seat 10, which will be transmitted to the perineal region of the rider. Fundamentally, a progression of support occurs because the rider's buttock does not conform to, or have the same radius as, the base 12, causing a maximum compression of the foam material to occur proximate the upturned lip 22 of base 12.

In a second embodiment, with reference specifically to FIG. 3, an inflatable air bladder 18, is utilized to cushion seat 10. Inflation nozzle 20 may be disposed to protrude through base 12, protecting the nozzle 20 from unintentional contact, and providing a passage for inflation of air bladder 18. The curvature of base 12 produces a pressure progression, similar to the embodiment utilizing foam material, when utilizing the air bladder 18; however, there is an added benefit in the natural movement of the air bladder 18. During the peddling cycle, the rider's legs 19 alternate in relative sequence. As shown in FIG. 7, the air bladder 18 shifts laterally side-to-side as the rider's legs 19 cycle. As one leg 19 moves downwardly, the air bladder 18 shifts toward the opposite and rising leg 19. This minimizes the friction associated with the conventional wide non-racing style seat, by having the cushioned portion of seat 10 not rigidly bear against a rider's legs, but rather move in conjunction with the natural movement of a rider.

The base 12 includes an upturned lip 22 uniformly disposed about its edge. This provides lateral retaining support to the cushioning means (air bladder 18 and/or foam 16) disposed Within, and provides a safely rounded edge to base 12.

The cushioning mean is thereafter surrounded by cover 24. The edge of cover 24 is drawn together, utilizing stitching or other means, to wrap around, bear upon, and be retained against the underside of base 12. In this manner, the cushioning means is properly retained against base 12 within the confines of cover 24. Further, a secondary layer of foam 26 can be inserted above and retained against air bladder 18 to further protect the bladder 18 from external punctures, or the cover 24 can be made suitably durable or of a relatively thick profile to accomplish the same effect.

With reference to FIG. 2, the seat 10 can be mounted directly on the bicycle 8, through the use of a bracket 30 which engages a standard bicycle seat angle downtube 32. Bolt 34 passes through holes in the down tube tracks 36. Tracks 36 are mounted on the flattened region 14 of base 12. The seat 10 can adjust laterally along the tracks 36 or rotationally about bolt 34, and then bolt 34 can be tightened to secure the seat 10 in place. With reference to FIG. 3, vertical adjustment is accomplished by clamp 38 which adjustably secures down tube 32 in bicycle 8.

Further, with reference to FIGS. 4, 5, and 6, the previously described attachment means can be mounted on a spring steel bracket 40 which slideably communicates with base 12. The spring bracket 40, made of spring steel or other suitable material, has a plurality of curved limbs 41, having a similarly dishlike curve to base 12, and which slideably bear against base 12. The limbs 41 both flex and slide along base 12 as the weight of a rider causes pressure on the seat 10. The curved limbs 41 include a curve steeper than the curvature of base 12 to provide a gap area 42 between the spring bracket 40 and base 12. The combined flexing and sliding movements of limbs 41 further serve cushion seat 10.

Threaded guide pins 44 are positioned to maintain the proper orientation of spring bracket 40 relative base 12. Threaded guide pins 44 are preferably configured as shoulder bolts, providing a smooth bearing surface 49 for slideable contact with spring bracket 40. Cap nuts 46 engaging the guide pins 44 and bearing on the angle slide tracks 47 can be adjusted to provide the spring bracket 40 with or without preloaded tension to accommodate a variety of rider weights, while further cushioning the bicycle seat. The attachment means otherwise functions in a manner similar to the previously described attachment device.

In the preferred embodiment, four limbs 41 extend radially from the attachment means centrally mounted on the spring bracket 40. These limbs, disposed in essentially 90 degree increments, support the seat 10 in its proper orientation. Further, the limbs 41 being evenly distributed about base 12, maintain this orientation under load.

From the foregoing description of the preferred embodiment it can be seen that various alternative embodiments of the invention can be anticipated without departing from the scope of the invention as defined in the claims.

I claim:

1. A bicycle seat, comprising:

a rigid base formed of a plate curved so as to substantially constitute a section of a sphere with a concave upper surface and a convex lower surface, an attachment section located on the lower surface of the base substantially midway along a longitudinal axis of the base, the edge of the base being contoured so as to form a rear section symmetrical about the longitudinal axis with its edge substantially constituting a circular arc centered about a point on the attachment section and a contiguous forward section symmetrical about said longitudinal axis, said forward section having widths along lines lateral to said longitudinal axis which are substantially narrower than the widths of the rear section along lateral lines similarly displaced from said attachment section;

attachment means secured to said attachment section for affixing the seat to a bicycle; and a cushion secured to the upper surface of the base, said cushion having a size substantially corresponding to the size of the base.

2. The invention of claim 1, wherein said cushion has a substantially uniform thickness.

3. The invention of claim 1, wherein said vehicle seat further includes an upturned lip disposed around the edge of said rigid base to further secure said cushioning body.

4. The invention of claim 1 wherein said attachment section is substantially flat.

5. The invention of claim 1, wherein said cushion is comprised of urethane foam.

6. The invention of claim 1, wherein said cushion includes an inflatable air bladder centrally disposed on the upper surface of said base.

7. The invention of claim 1, wherein said attachment means includes a spring bracket having a plurality of limbs slidably retained against the convex lower surface of said base.

8. A bicycle seat, comprising:

a rigid base formed of a plate curved so as to substantially constitute a section of a sphere with a concave upper surface and a convex lower surface, an attachment section located on the lower surface of the base substantially midway along a longitudinal axis of the base, the edge of the base being contoured so as to form a rear section symmetrical about the longitudinal axis with its edge substantially constituting a circular arc centered about a point on the attachment section and a contiguous forward section symmetrical about said longitudinal axis, said forward section having widths along lines lateral to said longitudinal axis which are substantially narrower than the widths of the rear section along lateral lines similarly displaced from said attachment section; said base further including an upturned lip disposed about the edge thereof;

attachment means secured to said attachment section for affixing the seat to a bicycle; and a cushion secured to the upper surface of the base, said cushion having a size substantially corresponding to the size of the base.

9. The invention of claim 8, wherein said attachment section is substantially flat.

10. The invention of claim 8, wherein said attachment means includes a spring bracket having a plurality of limbs slidably retained against the convex lower surface of said base.

11. The invention of claim 8, wherein said rigid base is generally configured as a section of a hollow sphere having a diameter in the range of greater or equal to 18 inches to less than or equal to 24 inches.

12. A bicycle seat, comprising:

a rigid base formed of a plate curved so as to substantially constitute a section of a sphere with a concave upper surface and a convex lower surface, an attachment section located on the lower surface of the base substantially midway along a longitudinal axis of the base, the edge of the base being contoured so as to form a rear section symmetrical about the longitudinal axis with its edge substantially constituting a circular arc centered about a point on the attachment section and a contiguous forward section symmetrical about said longitudinal axis, said forward section having widths along lines lateral to said longitudinal axis which are substantially narrower than the widths of the rear section along lateral lines similarly displaced from said attachment section;

attachment means secured to said attachment section for affixing the seat to a bicycle;

a cushion secured to the upper surface of the base, having an inflatable air bladder so that the natural peddling motion of a rider causes the air in said bladder to shift from side-to-side, decreasing the friction between said rider and said seat; and a cover retained against said base, so as to surround said air bladder.

13. The invention of claim 12, wherein said attachment means includes a spring bracket having a plurality of limbs slidably retained against the convex lower surface of said base.

14. The invention of claim 12, wherein said rigid base is generally configured as a section of a hollow sphere having a diameter in the range of greater than or equal to 18 inches to less than or equal to 24 inches.

15. The invention of claim 12, wherein said cover further includes a section of cushioning material.

16. A bicycle seat, comprising:

a rigid base;

a spring bracket having a plurality of curved limbs which are supporting said base, said limbs being slideably retained against said base; and attachment means disposed on said spring bracket, whereby said bicycle seat is disposed on a bicycle.

17. The invention of claim 16, wherein said plurality of limbs includes four limbs oriented radially from said attachment means in substantially 90 degree increments to support said base.

18. The invention of claim 16, wherein said bicycle seat further includes a plurality of guide pins rigidly attached to said base and extending through said spring bracket so as to maintain the proper alignment of said spring bracket with said base.

* * * * *